(12) United States Patent
Cunniff et al.

(10) Patent No.: US 8,095,395 B2
(45) Date of Patent: Jan. 10, 2012

(54) METHOD, SYSTEM, AND COMPUTER READABLE MEDIUM FOR ANALYZING DAMAGE TO A PACKAGE IN A SHIPPING ENVIRONMENT

(75) Inventors: Shawn Cunniff, Sandy Springs, GA (US); Patrick M. McDavid, Warrenville, IL (US); Chad Kelvin Thompson, Redding, CA (US); Susan Oliver Landstrom, Johns Creek, GA (US); Arthur Michael Pendowski, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 175 days.

(21) Appl. No.: 11/861,035

(22) Filed: Sep. 25, 2007

(65) Prior Publication Data
US 2009/0083078 A1    Mar. 26, 2009

(51) Int. Cl.
*G06Q 40/00* (2006.01)

(52) U.S. Cl. .................. 705/4; 705/22; 705/26; 705/28; 705/29

(58) Field of Classification Search ........... 705/4, 35–45
See application file for complete search history.

(56) References Cited

U.S. PATENT DOCUMENTS

| | | | |
|---|---|---|---|
| 4,153,159 A | 5/1979 | Smith, Jr. | |
| 4,197,914 A | 4/1980 | Grey | |
| 5,027,578 A | 7/1991 | Natterer et al. | |
| 5,711,138 A | 1/1998 | Yamamoto | |
| 5,884,456 A | 3/1999 | Hansen | |
| 5,888,838 A * | 3/1999 | Mendelson et al. | 438/15 |
| 5,971,587 A * | 10/1999 | Kato et al. | 700/115 |
| 6,862,543 B1 | 3/2005 | Tanimoto et al. | |
| 7,062,395 B2 | 6/2006 | Tanimoto et al. | |
| 7,207,485 B2 | 4/2007 | Silverbrook et al. | |
| 7,229,849 B2 | 6/2007 | Kang | |
| 7,234,597 B2 | 6/2007 | Rowe et al. | |
| 7,313,460 B1 * | 12/2007 | Prater et al. | 700/213 |
| 2003/0105704 A1 * | 6/2003 | Sundel | 705/37 |
| 2003/0140701 A1 | 7/2003 | O'Brien et al. | |
| 2003/0200111 A1 * | 10/2003 | Damji | 705/1 |
| 2003/0222784 A1 | 12/2003 | Nurse et al. | |
| 2004/0260512 A1 | 12/2004 | Olsson | |
| 2005/0049835 A1 | 3/2005 | Mayer et al. | |
| 2005/0055258 A1 * | 3/2005 | Myrick et al. | 705/8 |
| 2005/0072234 A1 | 4/2005 | Zhu et al. | |
| 2005/0075802 A1 | 4/2005 | Tanimoto et al. | |

(Continued)

OTHER PUBLICATIONS

"FedEx Ship Manager Software Downloads", "http://www.fedex.com/us/software/downloads.html", 4 pages, dated Mar. 11, 2008.*

(Continued)

*Primary Examiner* — Ella Colbert
*Assistant Examiner* — Hai Tran
(74) *Attorney, Agent, or Firm* — Alston & Bird LLP

(57) ABSTRACT

A method and system for analyzing damage to a package to process a damage claim is disclosed. Each package contains one or more pieces of merchandise, internal packaging surrounding the merchandise, such as bubble sheets, and external packaging, such as an envelope or box. In accordance with the method of the present invention, the system is configured to determine the type of merchandise within a package, associate a fragility class with the merchandise, and determine the minimum packaging requirements for the merchandise by referencing one or more minimum packaging requirements matrices. Depending on the comparison of the package with the minimum packaging requirements, the present invention either approves or denies a damage claim for the package.

24 Claims, 20 Drawing Sheets

DEFINE MERCHANDISE PROCESS

U.S. PATENT DOCUMENTS

| | | |
|---|---|---|
| 2005/0122524 A1 | 6/2005 | Ibarra et al. |
| 2005/0125119 A1 | 6/2005 | Srack et al. |
| 2005/0137912 A1* | 6/2005 | Rao et al. .......................... 705/4 |
| 2006/0106549 A1 | 5/2006 | Olsson |
| 2007/0045413 A1 | 3/2007 | Patrick |
| 2007/9987988 | 4/2007 | Hellman et al. |
| 2007/0095022 A1 | 5/2007 | Nissen |
| 2009/0083078 A1 | 3/2009 | Landstrom et al. |

OTHER PUBLICATIONS

International Search Report and Written Opinion of the International Searching Authority for corresponding International Application No. PCT/US2008/05454; mailed Aug. 29, 2008.

Non-Final Office Action received for U.S. Appl. No. 12/104,860 dated Oct. 12, 2010.

Office Action for U.S. Appl. No. 12/104,860 mailed Aug. 16, 2011.

Non-Final Office Action U.S. Appl. No. 12/104,860 dated Jan. 13, 2010 Final Office Action U.S. Appl. No. 12/104,860 dated Jun. 24, 2010 http://www.quantum.com/ServiceandSupport/Index.aspx, Oct. 1, 2005.

http://www.tc.gc.ca/CivilAviation/commerce/, Nov. 21, 2007.

http://ehs.ucsc.edu/lab_research_safety/pubs/bio/Non-Infectious-ShippingGuidelines.htm, May 6, 2005.

http://www.finds.org.uk/conservation/note3.php, Nov. 25, 2005.

http://www.trademe.co.nx/Help/Topic.aspx?help_id=490 &skid=postage&crm_subject_id=&crm_subject_path=, Mar. 11, 2010.

http://fedex.com/us/solutions/fsm/shippingadministration.html, Sep. 24, 2005.

http://www.fedex.com/us/developer/index.html, Oct. 11, 2007.

http://www.usps.com/business/shippingtools, Jul. 27, 2008.

http://www.fedex.com/us/software/downloads.html, Mar. 11, 2008.

http://www.fedex.com/us/customersupport/express.faq, Mar. 11, 2008.

http://www.fedex.com/business/shippingtools, Mar. 11, 2008.

http://www.usps.com/all/mailingandshippingguidelines/welcome.htm, Mar. 11, 2008.

http://www.fedex.com/us/developer/index.html, Mar. 11, 2008.

Notice of Allowance for U.S. Appl. No. 12/104,860 mailed Sep. 28, 2011.

"FedEx Ship Manager Software Downloads", http://www.fedex.com/us/software/downloads.html, 4 pages, dated Mar. 11, 2008.

* cited by examiner

DEFINE MERCHANDISE PROCESS

|  | Exterior Packaging | | | | | | |
|---|---|---|---|---|---|---|---|
| Fragility Class | Re-Used Corrugated Shipping Containers | | | | | | |
|  | Single Wall | | Double Wall Corrugated | | | Triple Wall Corrugated | Foreign Corrugated |
|  | 32 ECT | 40 ECT | 48 ECT | 200 Burst | 51 ECT | | |
| Rugged | | | | | | | |
| 1-5 | X | X | X | X | X | X | X |
| 5-10 | X | X | X | X | X | X | X |
| 10-20 | X | X | X | X | X | X | X |
| 20-30 |  | X | X | X | X | X | X |
| Semi-Rugged | | | | | | | |
| 1-5 | X | X | X | X | X | X | X |
| 5-10 | X | X | X | X | X | X | X |
| 10-20 | X | X | X | X | X | X | X |
| 20-30 |  | X | X | X | X | X | X |
| Semi-Delicate | | | | | | | |
| 1-5 | X | X | X | X | X | X | X |
| 5-10 | X | X | X | X | X | X | X |
| 10-20 | X | X | X | X | X | X | X |
| 20-30 |  | X | X | X | X | X | X |
| Delicate | | | | | | | |
| 1-5 | X | X | X | X | X | X | X |
| 5-10 | X | X | X | X | X | X | X |
| 10-20 | X | X | X | X | X | X | X |
| 20-30 |  | X | X | X | X | X | X |
| Fragile | | | | | | | |
| 1-5 | X | X | X | X | X | X | X |
| 5-10 | X | X | X | X | X | X | X |
| 10-20 | X | X | X | X | X | X | X |
| 20-30 |  | X | X | X | X | X | X |

FIG. 4

| Fragility Class | Internal Packaging (503) | | | | | | |
|---|---|---|---|---|---|---|---|
| | | Bubble Sheeting | | | | | |
| | Air Bags | Small Cell | Amount | Large Cell | Amount | Peanuts | Amount |
| Response | 19 | 2 | 1 | 3 | 4 | | 10 |
| Rugged | | | | | | | |
| 0.1-5.0 | X | X | <1" | X | <1" | X | >1" |
| 5.1-10.0 | X | X | <1" | X | <1" | X | >1" |
| 10.1-20.0 | X | X | <1" | X | <1" | | |
| 20.1-30.0 | | X | <1" | X | <1" | | |
| Semi-Rugged | | | | | | | |
| 0.1-5.0 | X | X | <1" | X | <1" | X | >1" |
| 5.1-10.0 | X | X | <1" | X | <1" | X | >1" |
| 10.1-20.0 | X | X | <1" | X | <1" | | |
| 20.1-30.0 | | X | <1" | X | <1" | | |
| Semi-Delicate | | | | | | | |
| 0.1-5.0 | X | X | <2" | X | <2" | X | >2" |
| 5.1-10.0 | X | X | <2" | X | <2" | X | >2" |
| 10.1-20.0 | X | X | <2" | X | <2" | | |
| 20.1-30.0 | | X | <2" | X | <2" | | |
| Delicate | | | | | | | |
| 0.1-5.0 | | X | <2" | X | <2" | | |
| 5.1-10.0 | | X | <2" | X | <2" | | |
| 10.1-20.0 | | | | X | <2" | | |
| 20.1-30.0 | | | | | | | |
| Fragile | | | | | | | |
| 0.1-5.0 | | X | <2" | X | <2" | | |
| 5.1-10.0 | | | | X | <2" | | |
| 10.1-20.0 | | | | | | | |
| 20.1-30.0 | | | | | | | |

| | Closure (504) | | | | | |
|---|---|---|---|---|---|---|
| Fragility Class | Tape | | | | | |
| | Poly Tape | | Paper Tape | Reinforced Tape | | Glue |
| | Single | Multiple | | Single | Multiple | |
| Response | 1 | 2 | 5 | 3 | 4 | 6 |
| Rugged | | | | | | |
| 0.1-5.0 | X | X | X | X | X | X |
| 5.1-10.0 | X | X | X | X | X | X |
| 10.1-20.0 | X | X | | X | X | X |
| 20.1-30.0 | X | X | | X | X | |
| Semi-Rugged | | | | | | |
| 0.1-5.0 | X | X | X | X | X | X |
| 5.1-10.0 | X | X | X | X | X | X |
| 10.1-20.0 | X | X | | X | X | X |
| 20.1-30.0 | X | X | | X | X | |
| Semi-Delicate | | | | | | |
| 0.1-5.0 | X | X | X | X | X | X |
| 5.1-10.0 | X | X | X | X | X | X |
| 10.1-20.0 | X | X | | X | X | X |
| 20.1-30.0 | X | X | | X | X | |
| Delicate | | | | | | |
| 0.1-5.0 | X | X | X | X | X | X |
| 5.1-10.0 | X | X | X | X | X | X |
| 10.1-20.0 | X | X | | X | X | X |
| 20.1-30.0 | X | X | | X | X | |
| Fragile | | | | | | |
| 0.1-5.0 | X | X | X | X | X | X |
| 5.1-10.0 | X | X | X | X | X | X |
| 10.1-20.0 | X | X | | X | X | X |
| 20.1-30.0 | X | X | | X | X | |

| FRAGILITY CLASS | A-RUGGED | | B-SEMI-RUGGED | | C-SEMI-DELICATE | | D-DELICATE | | E-FRAGILE | |
|---|---|---|---|---|---|---|---|---|---|---|
| | 1 | | 4 | 5 | 7 | | 8 | 12 | 13 | 14 |
| ENVIRONMENTAL VARIABLE | N | | N | N | N | | N | Y | N | Y |
| IS IT VIBRATION SENSITIVE | N | | N | N | Y | | N | Y | Y | Y |
| IS IT SHOCK SENSITIVE | N | | Y | N | Y | | Y | Y | Y | Y |
| IS IT EDGE SHOCK SENSITIVE | N | | N | N | N | | Y | N | Y | Y |
| IS IT COMPRESSION SENSITIVE | N | | N | Y | N | | Y | | | |
| FEATURES | CAN WITHSTAND > 3A DROP, VIBRATION AND COMPRESSION. CLOSURE AND LABELING ARE IMPORTANT. PRODUCT SEPARATION IS UNIMPORTANT BETWEEN MULTIPLE ITEMS | | THESE PRODUCTS ARE POTENTIALLY SENSITIVE TO EDGE SHOCK AND POTENTIALLY COMPRESSION IF THE CONTAINER SHAPE IS COMPROMISED. END SHIPMENT PRODUCT APPEARANCE (DENTS/SCUFFING) IS ALSO IMPORTANT | | VIBRATION TO THE PRODUCT ALONE IS NOT CRITICAL. PACKAGE VIBRATION COULD BECOME CRITICAL. PRODUCTS ARE STILL RATHER SENSITIVE TO 3A SHOCK AND COMPRESSION IS GENERALLY NOT A DAMAGE CAUSING FACTOR | | THESE PRODUCTS ARE VERY SENSITIVE TO ANY 3A COMPRESSION AND EDGE SHOCK | | ALWAYS VERY SENSITIVE TO 3A SHOCK AND EDGE SHOCK. SOME PRODUCTS ARE ALSO VERY SENSITIVE TO VIBRATION AND COMPRESSION AS WELL AS CLIMATIC CONDITIONS. INNER PACKAGING PROPERTIES ARE ALWAYS CRITICAL | |
| ITEM EXAMPLES | TIRES/CLOTHING/ MAGAZINES/ DVDs AND CDs | | BOOKS/ COPY PAPER/ IKEA FURNITURE/ POWER TOOLS/ LIQUIDS IN PLYABLE PLASTIC | LAMP SHADES/ HAT | COMPUTER/HEAVY CRYSTAL VASE/LIQUIDS IN GLASS | | MINI BLINDS/ WOOD SHUTTERS | TELE-SCOPE | STEMWARE/ CHINA/ LIQUIDS IN BRITTLE PLASTIC/ WINDOWS | SENSITIVE EQUIPMENT (CALIBRATION) MICROSCOPE/ HANDCRAFTED POTTERY/ CLOCKS |

FIG. 7

▶ Merchandise Classification: (If there are multiple damaged merchandise items, select all classifications that apply)

- ☒ Apparel
- ☐ Appliance Parts
- ☐ Appliances & Home Fixtures
- ☐ Arts and Crafts
- ☐ Automotive, Motorcycle and Airplane Parts
- ☐ Batteries
- ☐ Blinds
- ☐ Building Supplies
- ☐ Business Paper Products/Books
- ☐ Candles (with & without glass)
- ☐ CDs/DVDs/Cassettes
- ☐ Consumer Electronics
- ☐ Copy and Computer Paper
- ☐ Display Cases
- ☐ Documents/Paperwork

- ☐ Electronic Accessories
- ☐ Exercise Equipment
- ☐ Food - Bags/Boxes
- ☐ Food - Bottles (Plastic)
- ☐ Food - Cans/Pails (Metal)
- ☐ Food - Cans/Pails (Plastic)
- ☐ Food - Glass
- ☐ Food - Other
- ☐ Framed Items (breakable)
- ☐ Furniture
- ☐ Hardware and Bulk Items
- ☐ Hats
- ☐ Health & Beauty
- ☐ Heating & Cooling
- ☐ Home Decor (breakable)

- ☐ Home Decor (non-breakable)
- ☐ Houseware (breakable)
- ☐ Houseware (non-breakable)
- ☐ Jewelry
- ☐ Jewelry and Storage Boxes/Cases
- ☐ Lab or Medical Equipment
- ☐ Lawn & Garden Equipment
- ☐ Lighting
- ☐ Liquids - Bottles (Plastic)
- ☐ Liquids - Cans/Pails (Metal)
- ☐ Liquids - Cans/Pails (Plastic)
- ☐ Liquids - Glass
- ☐ Liquids - Other
- ☐ Live Animals
- ☐ Live Plants

- ☐ Long Rods
- ☐ Magazines or Catalogs
- ☐ Musical Instruments
- ☐ Office Supplies
- ☐ Packaging/Paper/Plastic Products
- ☐ Pet Care
- ☐ Pharmaceutical/Medical Supplies
- ☐ Power and Hardware Tools
- ☐ Samples
- ☐ Sporting Equipment
- ☐ Toys and Hobby
- ☐ TV's
- ☐ Wallpaper
- ☐ Windows and Windshields
- ☐ Merchandise does not fit in any of the above classifications

Merchandise Classification Determination

Is the merchandise crushable or will standing on the merchandise cause damage? 86 → (Select One) ▶ Required Will dropping on the merchandise on its edge cause damage? 86 → (Select One) ▶ Required Will dropping the merchandise from waist high cause damage? 86 → (Select One) ▶ Required Will repeated shaking of the merchandise cause damage? 86 → (Select One) ▶ Required Previous  Next

General Information

| Field | | |
|---|---|---|
| Tracking Number: | | Required |
| Package Weight: | lbs | Required |
| Package Length: | | Required |
| Package Width: | | Required |
| Package Height: | | Required |
| Location: | (Select One) ▶ | |
| Key entry completed by: | Operations ▶ | |
| Is merchandise a fallout: | No ▶ | |

▶ Damaged Merchandise Information:

Damaged Merchandise Information:    Required

⟨ 86 ⟩

Total number of items damaged:    Required

Total number of "same" items in carton:    Required

Is the outside carton, container or box: ○ New ○ Used    Required

▲ Merchandise Classification: (If there are multiple damaged merchandise items, select all classifications that apply)

▶ Package Info. - Corrugated Shipping Containers

| Single Wall | Single Wall | Double Wall | Double Wall | Other |
|---|---|---|---|---|
| ○ 32 ECT | ○ 200 Burst | ○ 48 ECT | ○ 200 Burst | ○ Single Faced |
| ○ 40 ECT | ○ 250 Burst | ○ 51 ECT | ○ 275 Burst | ○ Triple Wall |
| ○ 44 ECT | ○ 275 Burst | ○ 61 ECT | ○ 350 Burst | ○ Foreign Corrugated |
| ○ 55 ECT | ○ 350 Burst | ○ 71 ECT | ○ 400 Burst | ○ No Certificate Visible on Box |
|  |  | ○ 82 ECT | ○ 500 Burst |  |
|  |  |  | ○ 600 Burst |  |

▶ Package Info. - Internal Packaging Type

☐ Small Cell Bubble Sheeting (<1")
☐ Foam Sheeting (<2")
☐ Shredded Material (=1<2")
☐ Soft Foam Cushions ☐ Small Cell Bubble Sheeting (=1<2")
☐ Loose Fill/Peanuts (=1")
☐ Shredded Material (<2")
☐ Foam in Bag ☐ Small Cell Bubble Sheeting (>=2")
☐ Loose Fill/Peanuts (=1<2")
☐ Air Bags
☐ Double Box ☐ Large Cell Bubble Sheeting (<1")
☐ Loose Fill/Peanuts (<2")
☐ Poly Bag
☐ Paper Carton ☐ Large Cell Bubble Sheeting (=1<2")
☐ Paper (=1")
☐ Corrugated - Suspension
☐ Formed Plastic/ Molded Fiberboard ☐ Large Cell Bubble Sheeting (>=2")
☐ Paper (=1<2")
☐ Corrugated - Built up or partitions
☐ Other ☐ Foam Sheeting (>1")
☐ Paper (<2")
☐ Rigid Foam Cushions
☐ No internal Packaging ☐ Foam Sheeting (=1<2")
☐ Shredded Material (=1")

▶ Package Info. - Closure Type

○ Tape - Poly (Single)  ○ Tape - Reinforced (Multiple)  ○ Nails or Screws  ○ Straps ○ Tape - Poly (Multiple)  ○ Tape - Paper  ○ Staples  ○ Other ○ Tape - Reinforced (Single)  ○ Glue

FIG. 17

▶ Package Info. - External Packaging Appearance

- ☐ Belt Burn
- ☐ Puncture Hole (from outside in)
- ☐ Bent
- ☐ Wet (from outside in)
- ☐ Crushed corners on box
- ☐ Crushed
- ☐ Open Flaps
- ☐ Other
- ☐ Torn
- ☐ Dented
- ☐ Wet (from inside out)
- ☐ No obvious damage to eternal package
- ☐ Puncture Hole (from inside out)

CACH

Date Found:      Time Found:
Tracking#:

Area:
Location Found:

Fallout:
Crushed:

Description:
Damaged____of____Total Items

PSC Person

F/T Supervisor:

Sort   Sun   Day   Twi   Night

Exception Scan by:

O/G Personnel only:

FIG. 20

METHOD, SYSTEM, AND COMPUTER READABLE MEDIUM FOR ANALYZING DAMAGE TO A PACKAGE IN A SHIPPING ENVIRONMENT

FIELD OF THE INVENTION

The present invention relates, generally, to the field of package shipment, and more specifically, to a method and system for investigating damage to packages in a shipping environment to process a damage claim.

BACKGROUND OF THE INVENTION

Despite the substantial investments made in logistics and sortation networks to avoid damage to packages during shipment, it is unfortunately the case that a certain small percentage of packages are damaged during shipment by virtually all shipping carriers. Damage may be caused by the fragility of the merchandise inside the package, the physical characteristics of the packages, the handling of the package, the distance traveled, and the conditions under which the packages are shipped. Some packages may be damaged only slightly with, for instance, aesthetic damage to the outer packaging. Other packages may be damaged to the point that the merchandise inside the package is damaged, destroyed, or lost during shipment.

When a package is damaged, the shipping carrier makes a determination as to whether the damage claim for the package should be approved. The shipping carrier notifies the sender of the damage and informs the sender as to the damage claim determination. The importance of the accuracy of such determination is critical for a variety of reasons. First, the accuracy of such determination will likely reduce damage claim costs for the shipping carrier. Payment of such insurance claims represents an expense for shipping carriers, and thus, the accuracy of the determination that a package has been damaged can have a direct impact on the financial bottom line for such businesses. Furthermore, paid insurance claims result in higher costs not only for package senders, such as merchants, but for end-level users, i.e. customers.

Second, customer churn from inaccurate and/or inconsistent determinations for damage claims may be increased. Customers who order merchandise from a business or individual expect for the package containing the merchandise to arrive intact, and in a timely fashion. The shipping customer expects that any damage claim notification and determination is prompt, fair and consistent. The merchandise or pieces of merchandise within delivered packages may be imperative for the customer or the customer's business. Thus, customers need damage claims to be handled properly, and accurately, so replacement merchandise may be ordered if necessary with funds from the damage claims. Consistency is important for shippers that experience claims to their shipments and receive varying results from the claims determination process. Customers may ask why a damage claim for one package was approved and a damage claim for a package packed exactly in the same manner was denied.

Completely eliminating the possibility of packages becoming damaged during shipment process would be impossible. However, it would be desirable to improve processing of damage claims in order to prevent damage claims from being paid when the merchandise inside the package is actually intact, or when the damage is not the fault of the shipping carrier due to improper packaging of the merchandise by the sender. Thus, it would be desirable to provide a system and method for determining compensation for damage claims on a basis that more accurately accounts for the actual damage incurred, and properly allocates the loss between the parties according to their fault in causing the damage. Also importantly, providing the customer with useful root cause feedback is critical to improving future shipping experiences.

SUMMARY OF THE INVENTION

Broadly described, the present invention comprises a package investigation system and method that accomplish one or more of the following goals: (a) to more precisely analyze damage to a package; (b) to improve quality control processes used to approve or deny damage claims for damaged packages; and (c) to reduce customer churn by improving damage claims determination predictability and consistency and (d) provide customers root cause feedback This package investigation system incorporates one or more factors relating to the package, including the exterior packaging, the internal packaging, whether the exterior packaging is new or used, the type of merchandise with the package, the quantity of merchandise in the package, the size of the package, the weight of the package, or the placement of the merchandise within the package.

To accomplish one or more of the above-stated goals, various embodiments of the damage investigation system are configured to: (a) ascertain the type of merchandise within the package; (b) associate a fragility class with the merchandise in the package; (c) determine minimum packaging requirements for the package based on the fragility class of the merchandise, weight, and size of the package; (d) determine if the package meets the minimum packaging requirements; (e) approve a damage claim if the package meets minimum packaging requirements; and (f) deny the damage claim if the package does not meet minimum packaging requirements. The system can further be configured to determine whether a business rule applies to the package under investigation. The business rule may be one requiring the approval of the damage claim for the package, or it may be one requiring its denial. The business rule may be defined, for example, using Boolean logic on one or more factors, as described above, input to the system. If a business rule applies to the package under investigation, the business rule may supersede the result of comparing the package to the minimum packaging requirements. In some embodiments, the system is configured to generate and communicate the approval or denial of the damage claim in signal form to a computing device, or it may generate a document indicating the approval or denial of the damage claim. The approval can be used to initiate the process of paying a damage claim, or conversely, a denial can be used to generate a communication in signal form or hardcopy to advise the shipper or recipient of the denial of the damage claim and the reason for such denial. This information may serve as the basis for informing the shipper of an error in its shipping processes to allow the shipper to correct the problem to avoid future damage to packages.

In various embodiments of the present invention, the package investigation system and method perform the following functions or steps as part of the "define merchandise" process: (a) receive the location information and tracking numbers for the package; (b) determine if an invoice is available for the package; (c) if an invoice is available for the package, derive merchandise details from the invoice; (d) select the merchandise from a list of merchandise based on merchandise details from the invoice; (e) generating one or more merchandise fragility inquiries if the merchandise is not included in the list of merchandise, and (f) communicate the merchandise type to the package investigation device. The merchandise fragility inquiries in step (e) may include, but are not limited to, inquiries requesting information regarding compression, shock, edge shock, and vibration.

Various embodiments of the present invention also involve media (computer-readable or otherwise) having a data structure adapted for storing information for analyzing damage to a package. The data structure comprises a plurality of fragility classes, with a plurality of weight ranges associated with each fragility class. The data structure also contains data associated with the minimum packaging requirements for internal packaging, external packaging, product placement, and closure for each fragility class of merchandise. These minimum packaging requirements comprise the result of numerous tests to determine the predicted minimum internal and external packaging necessary to meet a particular packaging standard or guideline, such as the International Safe Transit Association Procedure 3A (www.ista.org).

Other embodiments of the present invention provide a computer-readable storage medium comprising a set of instructions for a computer device used to analyze damage to a package to process a damage claim. The set of instructions are executable by a computer to: (1) define the merchandise; (2) assign the merchandise to a fragility class; (3) determine the minimum packaging requirements for the package based on the fragility class; (4) compare the package to the minimum packaging requirements; and (5) approve or deny the damage claim based on the comparison result. The computer-readable medium may further comprise instructions operative to determine if an applicable business rule exists, and if so, approving or denying the damage claim pursuant to the applicable business rule. An applicable business rule will supersede the result of comparing the package to the minimum packaging requirements. The computer-readable instructions may be further operative to operate over the Internet or another network.

Further embodiments of the present invention provide a package investigation system for analyzing damage to a package, said system comprising a processing unit, a memory, an I/O module, and a program module stored in the memory. The program module comprises instructions which the processing unit executes to perform methods associated with analyzing damage to one or more packages, including: (1) determining the type of merchandise within a package; (2) associating a fragility class with the package; (3) determining the minimum packaging requirements for the package; (4) comparing the package with the minimum packaging requirements; and (5) approving or denying a damage claim based on the comparison of the package with the minimum packaging requirements. This comparison may involve comparing the minimum packaging requirements with packaging information regarding the package, which may include certain details including the type of exterior packaging, type of internal packaging, whether the external packaging is new or used, details regarding the damage to the package, the dimensions of the package, and weight of the package.

Other embodiments of the present invention provide a package investigation system, wherein the system comprises a memory having a minimum packaging requirements matrix module, a damage assessor module, a claim processor module, a processor, a storage device, a display device, an output device, and a network interface. The minimum packaging requirements matrix module stores one or more minimum packaging requirements matrices, which are discussed in greater detail in the discussion of FIGS. 3-6. The damage assessor module is configured to define the merchandise and assign the package to a fragility class based on said "define merchandise" process, explained in detail in the discussion of FIG. 2. The claim processor module is configured to approve or deny the damage claim based on the minimum packaging requirements and any applicable business rules. Finally, the output device transmits an indication regarding the approval or denial of the damage claim to a party using the package investigation system, which may include a computing device.

Other advantages and benefits of the present invention will become apparent upon reading and understanding the present specification when taken in conjunction with the appended drawings.

BRIEF DESCRIPTION OF DRAWINGS

Figure 1:
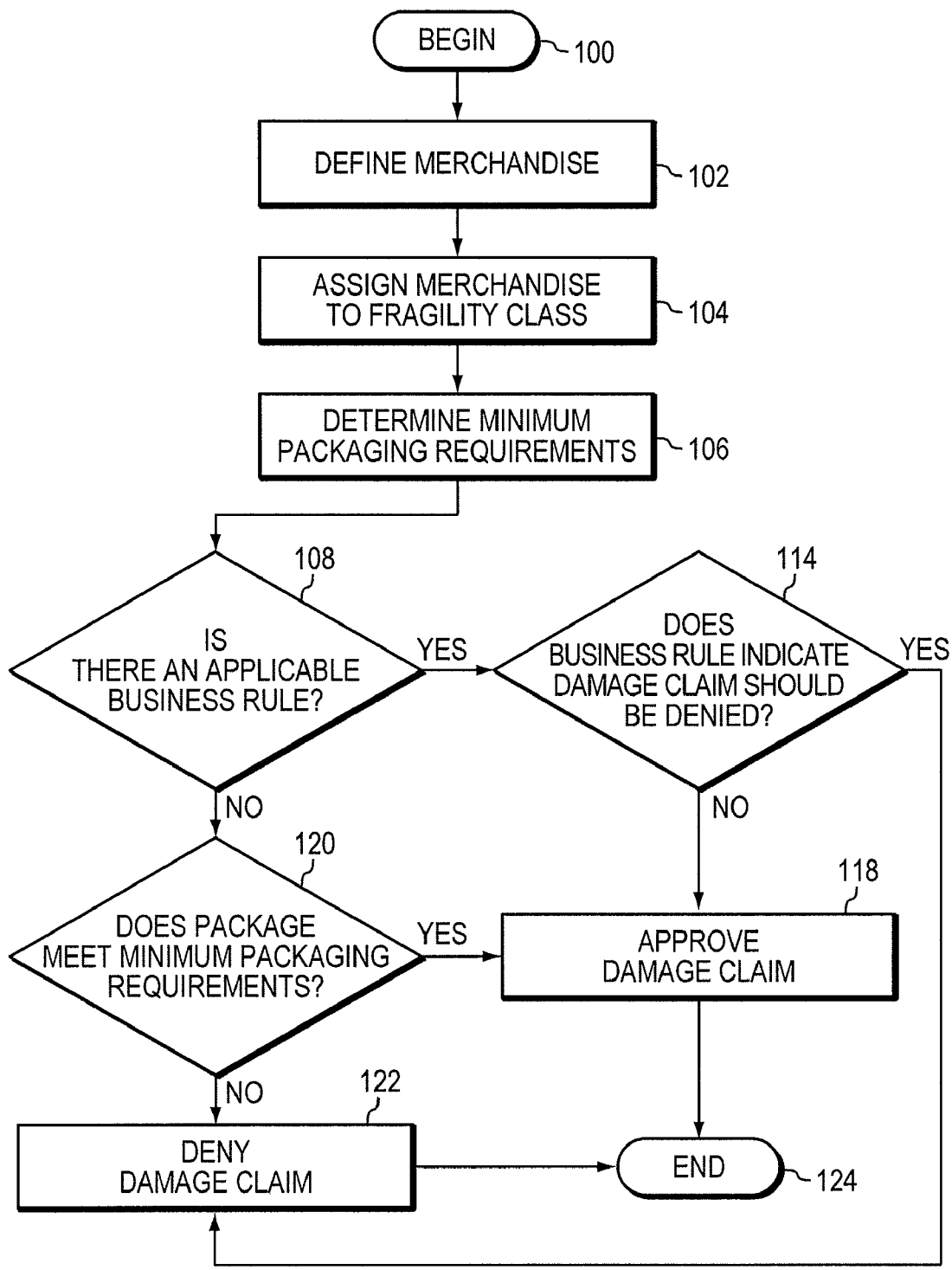

Having thus described the invention in general terms, reference will now be made to the accompanying drawings, which are not necessarily drawn to scale, and wherein:

FIG. 1 is a flow diagram of the package investigation method in accordance with an embodiment of the present invention.

Figure 2:
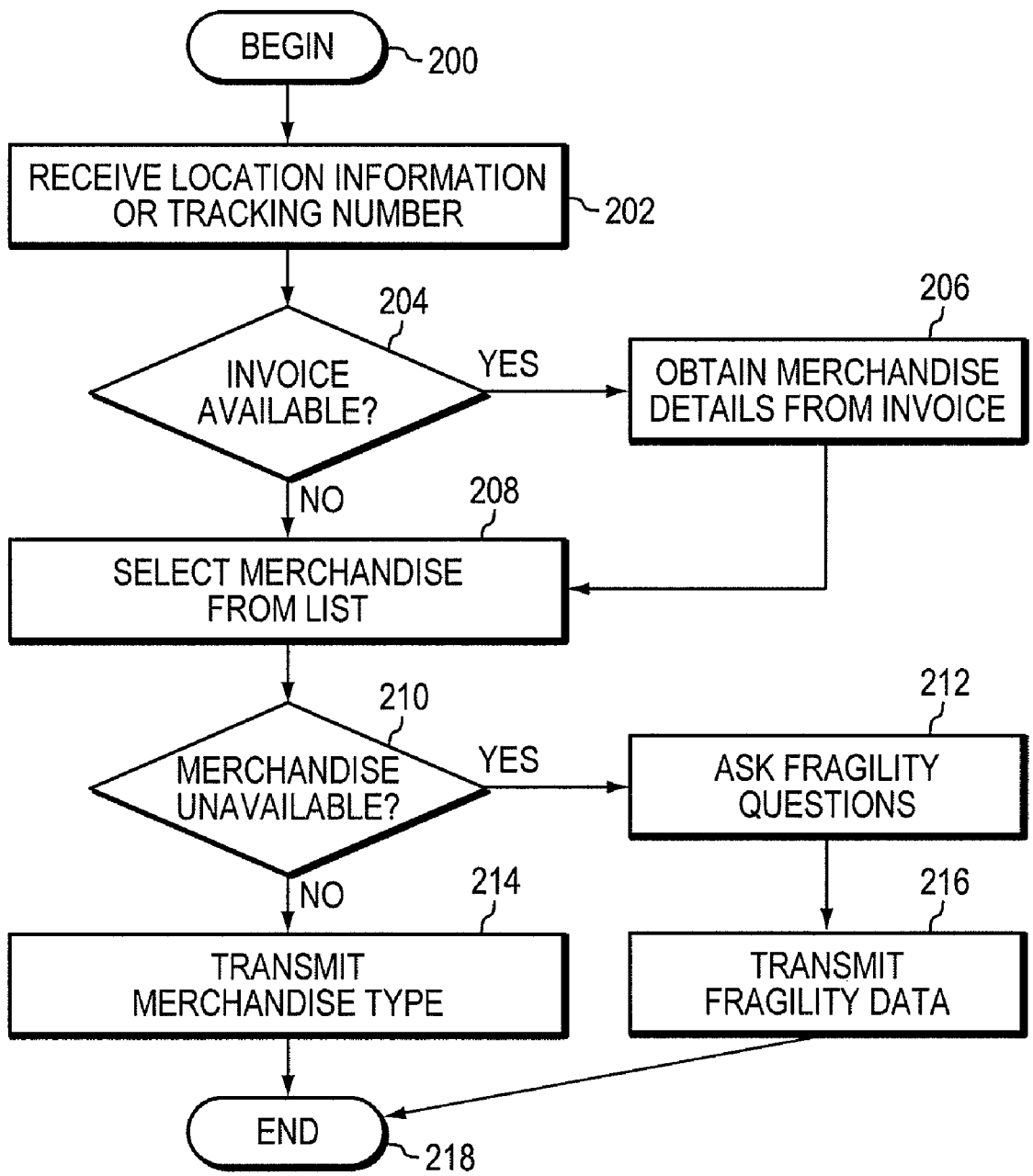

FIG. 2 is a flow diagram illustrating the steps for the define merchandise process according to an embodiment of the present invention.

Figure 3:
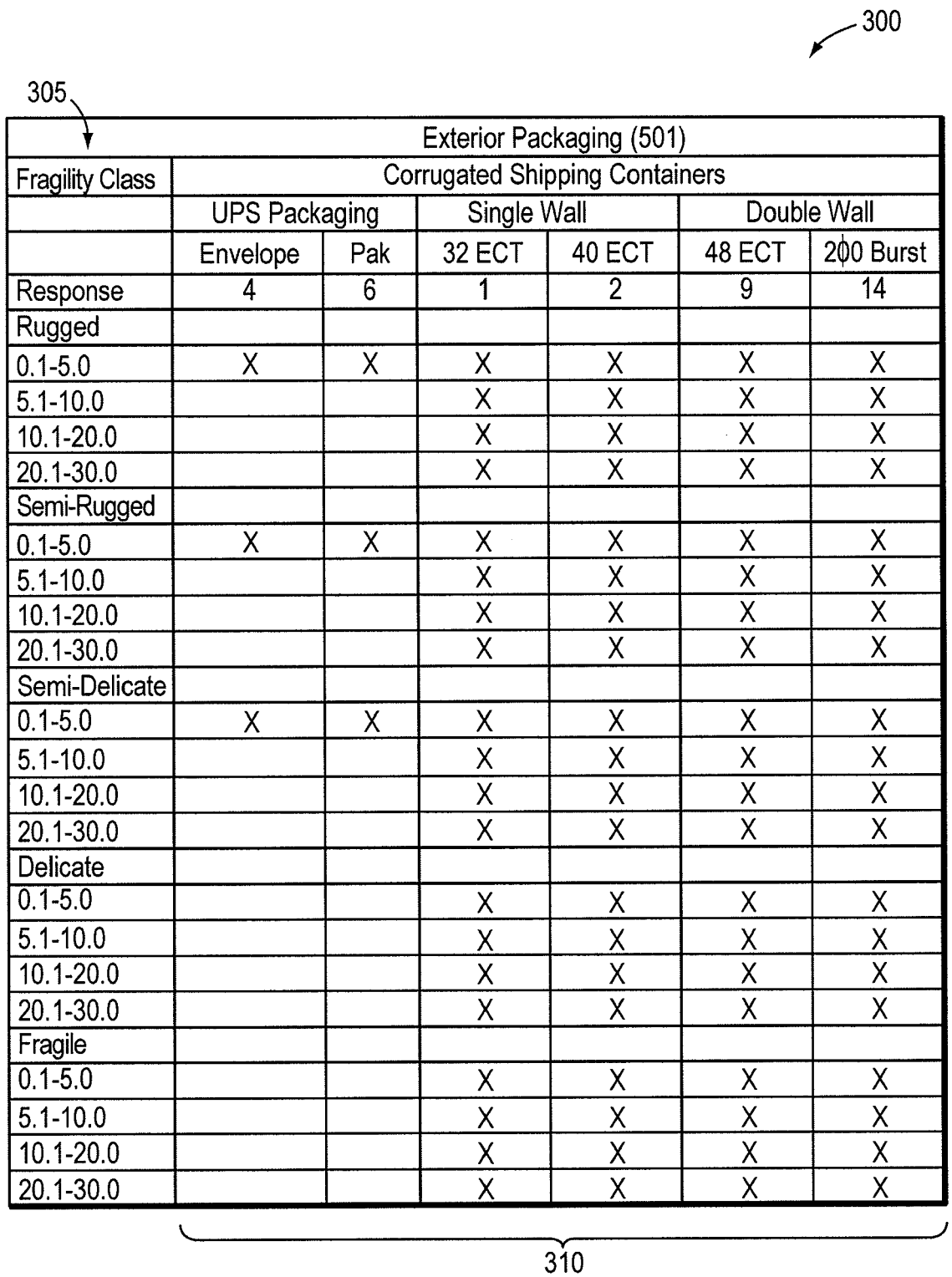

FIG. 3 depicts an exemplary matrix for presenting the minimum packaging requirements for exterior packaging comprising a new corrugated shipping container.

FIG. 4 depicts an exemplary matrix for presenting the minimum packaging requirements for exterior packaging comprising a re-used corrugated shipping container.

FIG. 5 depicts an exemplary matrix for presenting the minimum packaging requirements relating to the internal packaging of the package.

FIG. 6 is an exemplary matrix for presenting the minimum packaging requirements relating to the closure details of the package.

FIG. 7 is an exemplary table for determining the fragility class for merchandise in response to the one or more fragility inquiries.

Figure 8:
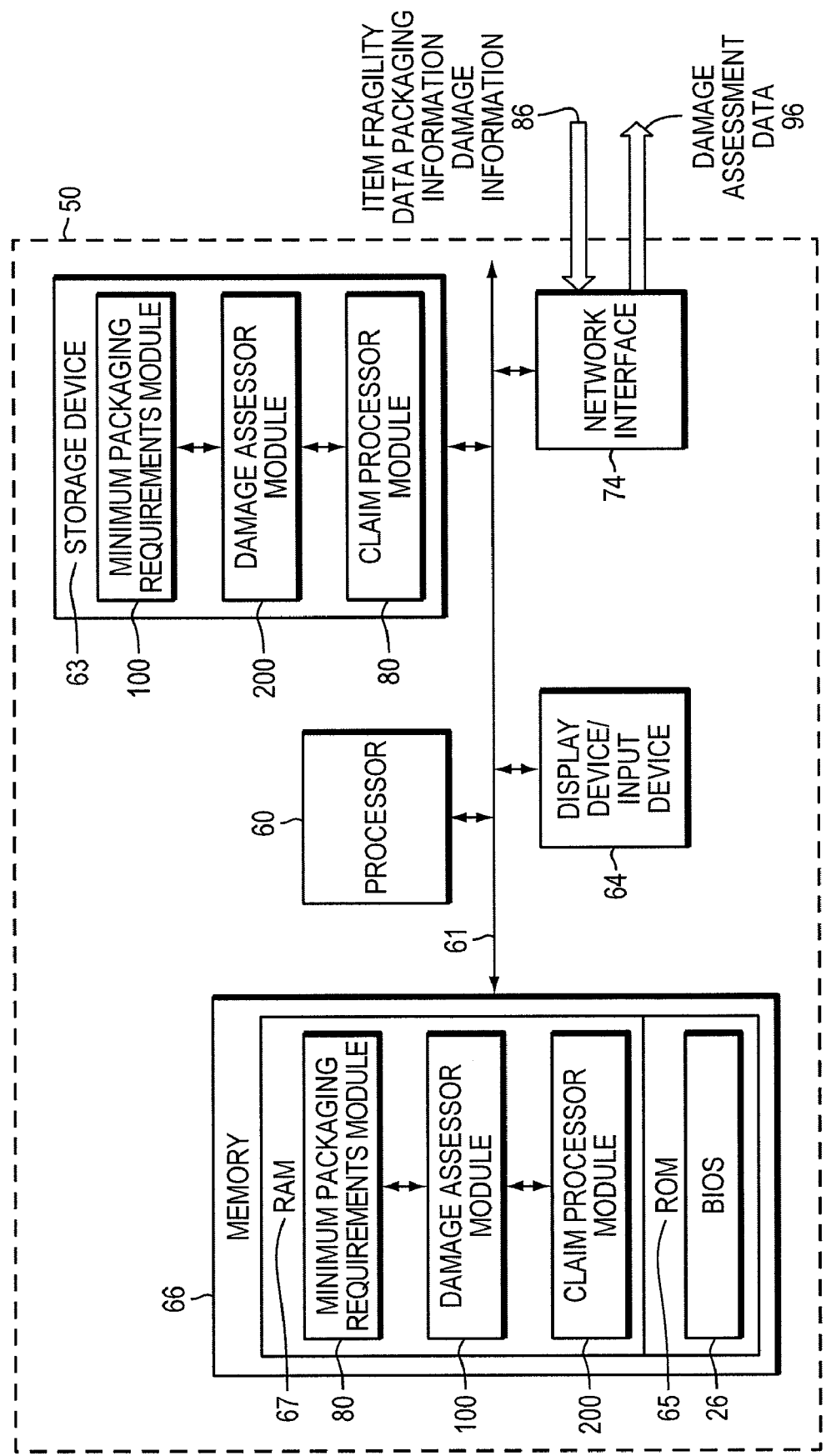

FIG. 8 is a schematic diagram of a package investigation device according to an embodiment of the present invention.

FIG. 9 is an exemplary interface for defining the merchandise within a package.

FIG. 10 is an exemplary interface for presenting the fragility inquiries to the user.

FIG. 11 is an exemplary interface for prompting a user to input location and tracking information.

Figure 12:
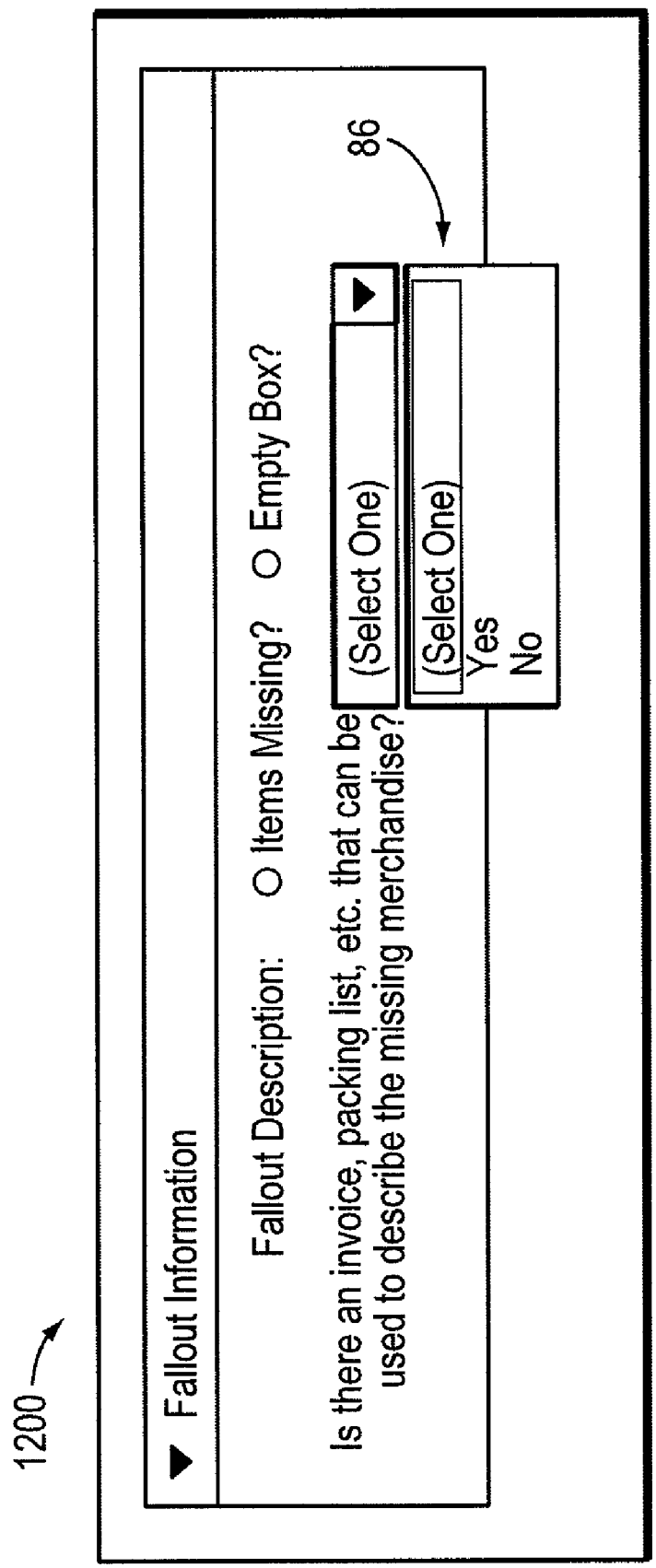

FIG. 12 is an exemplary interface for prompting a user for information relating to merchandise fallout.

FIG. 13 is an exemplary interface for prompting a user for damage information.

Figure 14:

FIG. 14 is an exemplary interface for prompting a user for information relating to the type of external packaging.

FIG. 15 is an exemplary interface for prompting a user for information relating to the corrugated shipping container.

FIG. 16 is an exemplary interface for prompting a user for internal packaging information.

FIG. 17 is an exemplary interface for prompting a user for package closure information.

Figure 18:
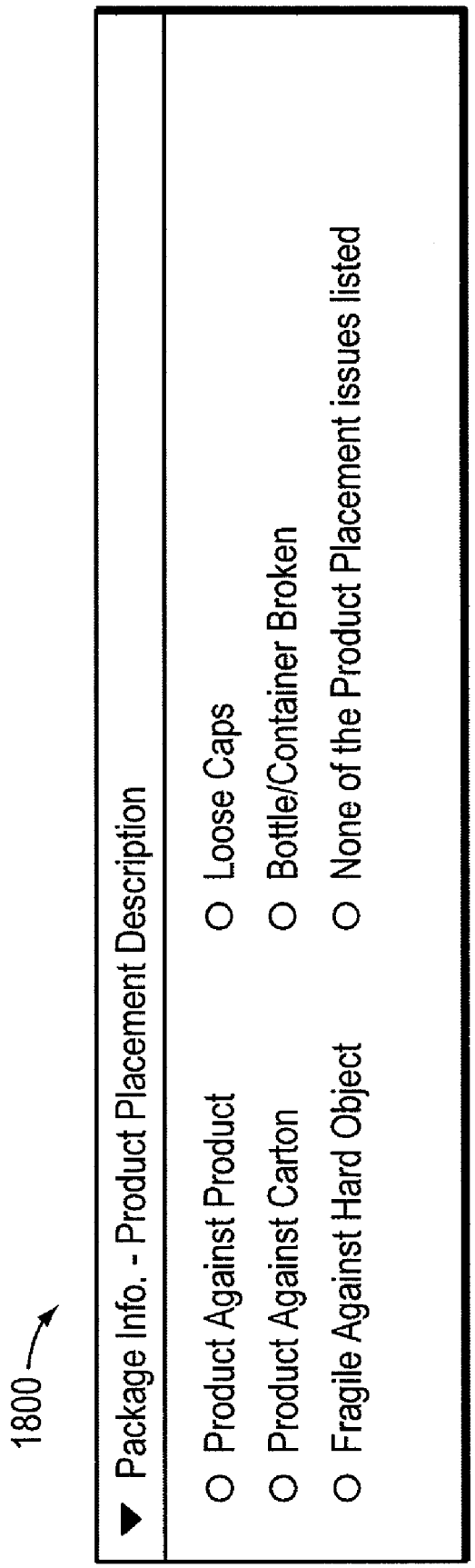

FIG. 18 is an exemplary interface for prompting a user for product placement description.

FIG. 19 is an exemplary interface for prompting a user for external package appearance information.

FIG. 20 is an exemplary damage discovery document for use in inspecting a damaged package.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Although the present invention is illustrated in terms of a method and system for analyzing damage to a package, the principles of the present invention may apply to analyzing damage to other merchandise. Furthermore, the method and system described herein performs the package investigation method to process a damage claim for the package. However, those of ordinary skill will recognize that the package investigation method may be performed for other reasons, such as determining whether a damaged package should be delivered to the recipient or returned to the sender.

Many other modifications and embodiments of the invention will come to mind to one of ordinary skill to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Definitions

For the purposes of this application, the following terms have the following definitions:

"Closure details" or "closure" refers to the manner or mechanism securing the exterior packaging of the package in a closed position. Exemplary mechanisms for closure include plastic tape, packing tape, staples, or glue.

"Damaged Package" is a package that has sustained damage to the outer packaging, the merchandise included within the package, or the internal packaging of the package.

"Damage Discovery Information" includes information relating to the time, place, and circumstances surrounding the package at the time damage is discovered. Damage discovery information may include, but is not limited to, personnel working at the time of damage discovery, location of the package, and the time/date of the damage discovery.

"Damage Information" is information or description regarding the damage to the package, which may relate to the external packaging, internal packaging, product placement, or closure of the package. This information may be received by the user via a user interface, or obtained by referencing a record for the package, such as an invoice or a damage discovery document used in unload, sort, or load operations.

"End User" or "User" is a computer, entity, or human user utilizing a system operating the present invention.

"Merchandise" refers to any object, or plurality of objects, that is shipped within a package from a sender to a recipient. The merchandise may be wrapped in internal packaging within the package.

"Minimum Packaging Requirements" refers to the results of testing to determine the predicted minimum external and internal packaging to meet a particular guideline or standard.

"Internal Packaging" refers to the environment surrounding the merchandise within the package. Typical internal packaging may comprise bubble wrap, foam or pulp peanuts, foam, plastic or cardboard inserts, air bags, paper or other packing materials.

"Outer Packaging" refers to the external casing for the package, including but not limited to, a cardboard box, envelope, or crate.

"Package" refers to any package or object which is sent by a sender via a shipping carrier to a recipient. The package may be of any size, and may include, but is not required to include, internal packaging, external packaging, and one or more pieces of merchandise within said internal packaging. The merchandise may also not include external packaging.

"Packaging Information" relates to any information concerning the package, including general information, dimensions, weight, condition, or any other physical characteristic of the package.

"Party to the shipping process" refers to any individual, business, or entity involved in the shipment of the package, including but not limited to, the sender, shipping carrier, or recipient.

"Recipient" is the individual, company, entity, party, or location intended to receive the package.

"Root Cause Information" comprises information relating to the cause of the damage to the package. Root cause information may be communicated to a sender or recipient along with approval or denial of a damage claim.

"Sender" is the individual, company, entity, party, or location sending the package containing the merchandise to a recipient.

"Shipping carrier" may refer to any shipping company, a shipping facility, individual shipper, or any entity involved with shipping a package from a sender to a recipient. An example of a shipping carrier may include UPS.

"Shipping Process" refers to the overall process to send a package from the sender to the recipient utilizing the services of the shipping carrier.

"User Interface" or "interface" is any type of interface with a user for displaying or obtaining information, including but not limited to, a graphical user interface, or an interface with an input/output means, such as a keyboard, monitor, or mouse.

Overview of Package Investigation Method

Various factors should be considered when determining whether to approve or deny a damage claim for a package. For example, if two packages, package A and package B have been compressed during the shipping process to only 60% of their former height, most damage determination processes may conclude that damage claims for both packages should be approved. However, this determination may prove erroneous if package A contained pillows and package B contained a marble statue. Furthermore, the statue in package B may potentially be intact if the statue is very small, and tightly wrapped in bubble sheets in a package that is securely closed by a large amount of acrylic packaging tape. The conclusion, however, may differ again if package B contains not one (1) marble statue, but fifty (50) marble statues. As evidenced by this example, the type of merchandise contained within the package, the quantity of pieces of merchandise, the internal packaging of the merchandise within such package, the placement of the merchandise within the package (product placement) and the type of closure of the package is critical when processing a damage claim.

Thus, there exists a need for an improved method of analyzing damage to packages when processing a damage claim that considers factors in addition to the appearance of the external packaging, including the type of merchandise within each package, type of inner packaging, type of external packaging, product placement, size of the package, weight of the package, and closure details of the package. The present invention provides this solution by associating the merchandise within the package with a fragility class. This association either results from the user selecting the type of merchandise via an interface, and the merchandise type has been pre-assigned to a fragility class. Alternatively, the user may respond to one or more inquiries regarding the merchandise's fragility (referred to as "fragility inquiries"), and the merchandise is then assigned to a fragility class based on the response to the one or more fragility inquiries. The assignment to a fragility class may be based on a variety of factors, including the material of the merchandise, the quantity of pieces of merchandise, and other physical characteristics of the merchandise.

A minimum packaging requirements matrix contains the minimum requirements for external packaging, internal packaging, product placement, and closure of the package. If the package does not meet the minimum requirements set forth in the minimum packaging requirements matrices, and if an intervening business rule does not dictate special treatment of the damage claim, the damage claim is denied. If a business rule applies to the package, the business rule will supersede the result of comparing the package to the minimum packaging requirements. If the package does meet the minimum requirements set forth in the minimum packaging requirements matrices, and if an intervening business rule does not dictate special treatment of the damage claim, the damage claim is approved. These steps, processes, and systems are discussed in more detail in the discussion of the drawings.

Referring now to the drawings in which like numerals represent like elements or steps throughout the several views, FIG. 1 is a flow diagram of the package investigation method in accordance with an embodiment of the present invention. The method of FIG. 1 would likely be performed when a package has been damaged, and a party to the shipping process is investigating the damage to the package. The method of FIG. 1 can be carried out by a human user or it may be executed in part or entirely by a computing device. The computing device executing the package investigation method may be a handheld portable unit, for example, to facilitate mobility of damage assessment personnel in inspecting packages at different locations within a subsystem.

Furthermore, the package investigation method of FIG. 1 involves several steps, each of which may include several sub-steps. For example, FIG. 2 depicts the steps involved in the "define merchandise" process step 102 of FIG. 1, according to one embodiment. Those with ordinary skill will appreciate that each step in the package damage investigation method shown in FIG. 1 may involve additional sub steps within the spirit and scope of the present invention.

The package investigation method begins at 100, and proceeds to the "define merchandise" process at step 102. The "define merchandise" process involves selecting the type of merchandise within the package. This selection is either performed manually, by receiving a selection from a user via a user interface, or determined by the system by analyzing details from an invoice associated with the package. More details regarding the "define merchandise" process are presented in the discussion of FIG. 2.

The method of the present invention associates a fragility class with the package at Step 104. This Step 104 may involve determining that the merchandise has previously been assigned to a fragility class pursuant to a previous assignment; and deriving the assigned fragility class for the merchandise by referencing said previously assignment. For example, a table or reference document may comprise different types of merchandise, and the corresponding fragility classes, which is referenced at step 104. This step 104 may also involve presenting one or more fragility inquiries to determine which fragility class to associate with the merchandise, which is discussed in greater detail in the discussion of FIGS. 7 and 10.

The fragility class is used to determine the minimum packaging requirements at step 106, which involves referencing the minimum packaging requirements matrixes. These minimum packaging requirements may comprise the results of testing to determine the predicted minimum internal and external packaging necessary to meet a particular standard, such as the International Safe Transit Association (ISTA) Procedure 3A which can be found on the website for ISTA, www.ista.org. The minimum packaging requirements matrices are explained in further detail in the discussion of FIGS. 3-6.

After determining the minimum packaging requirements for the package by referencing the minimum packaging requirements matrices at step 106, the package investigation method determines at step 108 whether there is a business rule which applies to the package, or the damage to the package. These business rules may be generated, created, or maintained by the shipping carrier, and may address particular situations wherein a damage claim should be approved or denied regardless of the minimum packaging requirements or packaging information. For example, a business rule may dictate that if a particular merchandise within a package is in the "fragile" fragility class, weighs under 5 lbs, and the package has been subjected to belt burn, then the damage claim should be approved regardless of the packaging of the merchandise.

To determine if a business rule applies at step 108, the package investigation method may involve referencing damage information, damage discovery information, information relating to package condition, or any other customer or shipping carrier supplied information for the package, which may be obtained in via a user interface (as described in greater detail in FIGS. 13 and 19) or prompting a user for additional information. Those with ordinary skill will appreciate that the business rules may number any amount of rules, and may address a variety of different damage or business situations.

If the package investigation method determines at step 108 that a business rule applies, then the package investigation method proceeds to step 114 and determines whether the business rule indicates that the damage claim should be approved or denied. An applicable business rule will supersede the result of comparing the package to the minimum packaging requirements, for example, at step 120. If the business rule indicates that the damage claim should be approved, then the damage claim is approved at step 118 and the package investigation method concludes at step 124. If the business rule indicates that the damage claim should be denied, then the damage claim is denied at step 122 and package investigation method concludes at step 124.

If the package investigation method determines that a business rule does not apply at step 108, the package investigation method inquires at step 120 whether the package meets the minimum packaging requirements. This step 120 involves comparing the minimum packaging requirements obtained from referencing one or more minimum packaging requirements matrices (described in further detail in the discussion of FIGS. 3-6) to information about the package, referred to in this application as "packaging information." This packaging information may include such information as details regarding the internal packaging, external packaging, product placement, closure, quantity of merchandise within the package, or any other information regarding the package. Step 120 may also involve referencing packaging information provided by the user via a user interface, referencing an invoice comprising packaging information, or prompting a user to enter packaging information in order to determine if the package meets the minimum packaging requirements.

If the package investigation method determines that the package does not meet the minimum packaging requirements at step 120, the damage claim for the package is denied at step 122 and the package investigation method terminates at step 124. If, however, the package investigation method determines that the package does meet the minimum packaging requirements at step 120, the damage claim for the package is approved, and the package investigation method terminates at step 124.

"Define Merchandise" Process

FIG. 2 is a flow diagram illustrating the steps for the "define merchandise" process according to an embodiment of the present invention. The "define merchandise" process 200 is performed in step 102 of the package investigation method 100 as described in FIG. 1. Thus, the "define merchandise" process 200 begins once the package investigation method 100 has commenced, as described in FIG. 1, or may occur before the commencement of damage investigation method 100. The purpose of the "define merchandise" process 200 is to ascertain the information utilized in assigning the merchandise to an appropriate fragility class, which is performed in the package investigation method at step 104. The fragility class is then used to determine the minimum packaging requirements at step 106 of the package investigation method 100.

After the "define merchandise" process begins at step 200, the system receives the location information, damage discovery information, or tracking number for the package at Step 202. This location information or tracking number for the package may be derived from a source connected to a system operating the present invention, such as an electronic invoice. Damage discovery information includes information about where in the system the damage was discovered, possible system conditions, time when the damage to the package was discovered, and name of personnel associated with the package (such as, the name of the supervisor working at the time of discovery). The location information or tracking number may also be entered by an end user via a user interface. Furthermore, the location information or tracking number may be received during or before the execution of the "define merchandise" process 200. This step 202, in one embodiment, may be omitted depending on the informational requirements or particular characteristics of the system operating the present invention.

The "define merchandise" process 200 determines next if an invoice is available for the package at Step 204, which may involve referencing a memory storing invoices by utilizing the location information or tracking number received from step 202. Step 204 may also involve referencing information obtained when the package was manifested or otherwise documented by the shipping carrier, including referencing Package Level Detail (PLD) information. This PLD information may be utilized to pre-populate fields of information in a user interface or otherwise supply information needed to the package investigation system.

The invoice associated with the package may comprise package information received from the sender upon initiation of the shipping process. This package information may include, but is not limited to, the geographical distance between the sender and the recipient, the distance necessary to deliver the shipment, the declared value of the merchandise, the weight of the package, the weight of the merchandise, the dimensions of the package, details concerning the external or internal packaging, or the existence of any enhanced claim agreement for damage claims.

If the invoice is available, then any available merchandise details are derived from the invoice at Step 206. These merchandise details may include, but are not limited to, the type of merchandise, information relating to how many pieces of merchandise are in the package, what type of material the merchandise is made of, whether the merchandise is hazardous, whether the merchandise may be damaged by exposure to water, whether the merchandise is made of glass, or whether the merchandise is perishable.

If the invoice is not available, the name or type of the merchandise is selected from a list of merchandise at Step 208. A list of merchandise may include classes broken down into subclasses, such as a class for liquids, then subclasses for liquids contained in a plastic bottle, liquids contained in a glass bottle, or liquids contained in another type of container. However, multiple methods or systems may be used to suggest or offer a list of merchandise. The list of merchandise may also include simply a field for the entry of a name or type of merchandise.

If the invoice was available at step 204, the list of merchandise may still be presented to the user at step 208, but may involve presenting a revised or redacted list based on the merchandise information. For example, if the invoice indicates the merchandise is fragile, with no other details, the user may be presented with a list of fragile merchandise for selection at step 208. If the merchandise information is sufficiently complete to allow determination of the type of merchandise, the step 208 may be omitted in one embodiment.

If there is not a name or type of merchandise that corresponds to the merchandise in the package at Step 210, one or more fragility inquiries are presented to the user to determine the merchandise type at step 212, which are discussed in greater detail in FIG. 8. These fragility inquiries require inputs from the user which identify the fragility of the merchandise, including inquiries regarding shock, edge shock, compression, and vibration characteristics. These inputs are referred to as "fragility data", which is transmitted to the package investigation system at step 216. Once the fragility data is received, the system will have sufficient information to assign the merchandise to a particular fragility class as part of the package investigation method 100. The "define merchandise" process terminates at step 210.

If the system determines that the merchandise was not unavailable at step 210, then the "define merchandise" process transmits the merchandise type at step 214. This step may involve communicating the merchandise type to a computing device, such as the package investigation device described in FIG. 7, a component of the package investigation device or other computing device, a human user, or another networked computing device. The merchandise type may comprise an indication identifying the type of merchandise, such as identification reflecting the merchandise comprises clothing, books, or glassware. Method 200 terminates at step 214.

Exemplary Minimum Packaging Requirements Matrixes

Once merchandise is assigned to a fragility class, the minimum packaging requirements may be obtained for the merchandise by referencing the minimum packaging requirements matrices as presented in FIGS. 3-6. Those with ordinary skill will appreciate that although exemplary minimum packaging requirements matrixes are presented in a particular format in FIGS. 3-6, such requirement matrixes may take any form or format which presents minimum packaging information or minimum packaging required to meet a certain standard, and the relationship between the fragility classes and the minimum packaging requirements for exterior packaging, internal packaging, product placement, and closure requirements.

Each minimum packaging requirements matrix shown in FIGS. 3-6 includes a plurality of rows comprising fragility class information, and a plurality of columns comprising external packaging information, internal packaging information, product placement, or closure requirements. Those with ordinary skill will recognize that the fragility class information may be presented in a plurality of columns, and the external packaging information, internal packaging information, product placement, and closure requirements may be presented in a plurality of rows. Thus, each matrix described in FIGS. 3-7 may be presented in any format, document, or data structure capable of demonstrating the relationship between the fragility classes and the external packaging information, internal packaging information, product placement, or closure requirements.

Some packages may include more than one piece of merchandise. In this instance, to use the minimum packaging requirements matrixes shown in FIGS. 3-7, the fragility class for the more fragile piece of merchandise will be utilized to determine the minimum packaging requirements for the entire package.

Referring now to the figures illustrating exemplary minimum packaging requirements matrixes, FIG. 3 depicts an exemplary matrix relating to the exterior packaging of the package when the exterior packaging comprises a new corrugated shipping container. The exemplary matrix 300 comprises a plurality of rows and columns. The first column on the left is a single column 305 for presenting fragility class information. The fragility classes listed comprise classes for rugged, semi-rugged, semi-delicate, delicate, and fragile merchandise and packages. Each fragility class is divided into one or more ranges, for example, 1-5, 5-10, 10-20, and 30-40, and so on, as shown in FIG. 3, based on the weight of the merchandise. For example, the 1-5 range applies to merchandise that weighs between 1-5 lbs. Those with ordinary skill will appreciate that these ranges may vary in different implementations within the spirit and scope of the present invention.

Each column in the plurality of columns 310 in the exemplary minimum packaging requirements matrix 300 presents information relating to a particular type of exterior packaging for a new corrugated shipping container. To utilize the matrix to determine the minimum packaging requirements for a particular package, the user would locate the appropriate row in column 305 that corresponds to the appropriate fragility class, and the corresponding weight of the merchandise. The user would then look at the corresponding row to determine the minimum packaging requirements. If the column is marked with an "X", then the corresponding type of exterior packaging associated with the column in columns 310 meets the minimum packaging requirements.

For example, suppose a damage inspector is analyzing a damaged package that contains clothing, which the shipping carrier has assigned to the rugged fragility class. The clothing weighs 6 lbs. and is packaged within a standard UPS® Box. To determine the minimum packaging requirements for the package, the damage inspector will locate the row in column 305 that corresponds to the 5-10 lb. range under the "Rugged" fragility class. Upon review of the minimum packaging requirements matrix 300, it is evident that the merchandise has been improperly packaged. The column corresponding to the UPS® Box is not marked with an "X" in the exemplary minimum packaging requirements matrix 300, and thus, the UPS® Box is not acceptable packaging for the merchandise. An associated damage claim for the merchandise would be denied because the merchandise was improperly packaged (unless an applicable business rule dictated otherwise).

FIG. 4 is an exemplary minimum packaging requirements matrix when the exterior packaging of the package comprises a re-used corrugated shipping container. Matrix 400 is structured similarly to matrix 300, with the plurality of fragility classes and corresponding ranges listed under column 405. Matrix 400, however, comprises a plurality of columns 410 for various types of re-used corrugated shipping containers, including single wall corrugated containers and double wall corrugated containers.

To use the matrix 400 of FIG. 4 to determine the minimum packaging requirements when the external packaging comprises a re-used corrugated shipping container, a user would locate row corresponding to the appropriate fragility class in column 405, and then the row corresponding to the weight range that includes the weight of the merchandise in the fragility class. The corresponding row contains the minimum packaging requirements for the re-used corrugated shipping container, and therefore, the user would locate the appropriate column in column 410 corresponding to the type of re-used corrugated shipping container.

Columns along the appropriate row which do not comprise an "X" indicate the re-used corrugated shipping container associated with that column do not meet the minimum packaging requirements. Thus, a damage claim for a package comprising that particular type of re-used corrugated shipping container would be denied unless an applicable business rule dictated otherwise. However, if the column corresponding to the type of re-used shipping container is marked with an "X" on minimum packaging requirements matrix 400 on the appropriate row, then the type of re-used corrugated shipping container meets the minimum requirements, and a damage claim for the package would be approved unless an applicable business rule dictated otherwise.

Similarly, FIG. 5 depicts an exemplary minimum packaging requirements matrix for presenting fragility information relating to the internal packaging of the package. The plurality of fragility classes are listed in column 5, along with a plurality of weight ranges under each fragility class. A plurality of internal packaging options are listed in columns 510. To determine the minimum packaging requirements for internal packaging, a user would locate the appropriate row in column 505 corresponding to the fragility class of the merchandise and the weight range including the weight of the merchandise. The user would then review the corresponding row to ascertain the minimum internal packaging requirements. Columns comprising an "X" indicate the internal packaging satisfies the minimum packaging requirements. If the column does not comprise an "X", then the internal packaging does not satisfy the minimum packaging requirements.

Similar in format to the previous minimum packaging requirements matrixes described in FIGS. 4 and 5, matrix 600 presents the minimum packaging requirements for closure of the package. Matrix 600 comprises a plurality of rows in a single column 605 which presents fragility class information. The fragility classes listed comprise fragility classes for rugged, semi-rugged, semi-delicate, delicate, and fragile merchandise. Each fragility class is divided into one or more weight ranges, for example, 1-5, 5-10, 10-20, and 30-40 lbs. The plurality of columns 610 comprise information relating to different types of closure, including but not limited to, polyester tape, paper tape, reinforced tape, glue, nails, screws, staples, straps, and an "other" selection. The matrix 600 also includes information relating to the placement of the product in the package (referred to as "product placement"). The product placement possibilities listed in columns 610 may include, but are not limited to, product against, or in contact with, (vs.) product, product vs. carton, and fragile vs. hard object.

To utilize matrix 600 to determine the minimum packaging requirements for closure information, a user would locate the appropriate row in column 605 that corresponds to the appropriate fragility class and weight of the package. The user would then review across the appropriate row to locate the appropriate column in columns 610 corresponding to the type of closure for the package. If the intersection between the row corresponding to the appropriate fragility class and weight range and the column corresponding to the type of closure is marked with an "X", then the package meets the minimum packaging requirements, and a damage claim for the package would be approved unless an intervening business rule dictated otherwise. If the intersection between the row corresponding to the appropriate fragility class and weight range and the column corresponding to the type of closure is not marked with an "X", then the package does not meet the minimum packaging requirements, and a damage claim for the package would be denied unless a superseding business rule dictated otherwise.

FIG. 7 is an exemplary table for determining the fragility class for merchandise in response to the one or more fragility inquiries. Table 700 is used at step 104 of parcel investigation method 100 if the "define merchandise" process resulted in the return of fragility data at step 216 in response to fragility inquiries being presented to the user at step 212 as a result of the unavailability of the merchandise in the list at step 210.

Table 700 comprises the one or more fragility inquiries 702, which in this exemplary table 700, includes fragility inquiries relating to vibration, shock, edge shock, and compression. Because four fragility inquiries were presented to the user, with yes or no response possibilities, a total of 8 different combinations of responses to the fragility inquiries are possible.

Thus, table 700 presents each possible combination of responses to the fragility inquiry, along with the fragility class assigned to each combination of responses. To determine the appropriate fragility class, a user (which may be a computing device) locates the corresponding combination of responses, and the fragility class listing in column 704 corresponding to the combination of responses is the fragility class for the merchandise.

Those with ordinary skill will appreciate that the substance of the fragility inquiries 702, the quantity of fragility inquiries, and the responses to the fragility inquiries, and the fragility classes 704, may vary depending on the type of industry operating the present invention, the preferences of the shipping carrier or other user operating the present invention, or the configuration of the system operating the present invention.

Embodiments of the Damage Investigation Method and Related Processes

As will be appreciated by one with ordinary skills, the present invention described may be embodied as a method, a transaction processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software, software operating on a stand-alone kiosk, a computing device, or software operating on a handheld computer device, any of which may be connected to the Internet or another network. Any suitable computer-readable storage medium may be used including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions executed on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In the various embodiments described herein, a "computer" or "computing device" may be referenced. Such computer may be, for example, a mainframe, desktop, notebook or laptop, a hand held device such as a data acquisition and storage device, or it may be a processing device embodied within another apparatus such as, for example, a wireless telephone. In some instances the computer may be a "dumb" terminal used to access data or processors over a network. In some embodiments, a computing device may have the capability to provide various types of customer notifications, including telephone, facsimile, mail, and electronic mail notifications. These notifications may include information, such as root cause information, indicating a reason for the approval or denial of a damage claim.

Turning to FIG. 8, one embodiment of a package investigation device 50 is illustrated that may be used to practice aspects of various embodiments of the invention. In FIG. 8, a processor 60, such as a microprocessor, is used to execute software instructions for carrying out the defined steps. The processor 60 communicates using a data bus 61 that is used to convey data and program instructions, typically, between the processor and memory 66.

The package investigation device 50 further includes memory 66, which preferably includes both read only memory (ROM) 65 and random access memory (RAM) 67. In various embodiments, memory 66 can be considered primary memory such as RAM memory or other forms which retain the contents only during operation, or it may be a non-volatile memory, such as ROM, EPROM, EEPROM, FLASH, or other types of memory that retain the memory contents. The memory 66 could also be secondary memory, such as disk storage, that stores large amount of data. The memory may also comprise any application program interface, system, libraries and any other data by the processor to carry out its functions. ROM 65 is used to store a basic input/output system 26 (BIOS), containing the basic routines that help to transfer information between components of the package investigation device, including the minimum packaging requirements matrix module 80, damage assessor module 100, and claim processor module 200. The processor's execution of these modules 80, 100, 200 may be used to carry out part or all of one or more steps of the processes of FIGS. 1 and 2. Thus, the processes of FIGS. 1 and 2 can be regarded as descriptive of the function or operation of the package investigation device 50 as its processor 60 executes these modules. In some embodiments, the disk storage may communicate with the processor using an I/O bus instead or a dedicated bus. The secondary memory may be a floppy disk, hard disk, compact disk, DVD, or any other type of mass storage type known to those skilled in the computer arts.

Also included in the package investigation device 50 is a display device/input device 64 for receiving and displaying data. This display device/input device 64 may be, for example, a keyboard or pointing device that is used in combination with a monitor.

In addition, the package investigation device 50 includes at least one storage device 63, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for the package investigation device 50. It is important to note that the computer-readable media described above could be replaced by any other type of computer-readable media known in the art. Such media include, for example, memory sticks (e.g., USB memories), magnetic cassettes, flash memory cards, digital video disks, and Bernoulli cartridges.

A number of program modules may be stored by the various storage devices and within RAM 67. Such program modules include minimum packaging requirements matrix module 80, a damage assessor module 100, and a claim processor module 200. Those with ordinary skill will appreciate that other modules may be present in RAM to effectuate the various embodiments of the present invention.

Also located within the package investigation device 50 is a network interface 74, for interfacing and communicating with other elements of a computer network. It will be appreciated by one of ordinary skill that one or more of the package investigation device 50 components may be located geographically remotely from its other components. Furthermore, one or more of the components may be combined, and additional components performing functions described herein may be included in the package investigation device 50.

Input information is input by a user to the package investigation device 50 via the network interface 74. In the embodiment depicted in FIG. 8, this input information 86 may include merchandise fragility data, damage discovery information, root cause information, packaging information, and damage information. This input information may vary, however, depending on the configuration and informational requirements of package investigation device 50.

The package investigation device 50 outputs an indication regarding the approval or denial of a damage claim 96. This indication may comprise any number of forms, including an electronic signal, a graphic or other indicia presented on an interface, a document, or an audible indication. Those of ordinary skill will appreciate that this indication 96 may take a number of forms within the spirit and scope of the present invention.

Those with ordinary skill will recognize that many other alternatives and architectures are possible and can be used to practice various embodiments of the invention. The embodiments illustrated in FIG. 8 can be modified in different ways or incorporated within a network and be within the scope of the invention.

FIGS. 10-19 are user interfaces generated and displayed on device 64 by processor 60 of FIG. 8 in order to solicit input of merchandise fragility data 86 from a damage analyst or other operator. The processor 60 uses the merchandise fragility data 86 to generate data 96 indicating the damage assessment for the package under investigation.

FIG. 9 is an exemplary interface demonstrating the "define merchandise" interface. This exemplary interface 900 is used in the "define merchandise" process 200 (which occurs as step 102 of the parcel investigation method 100) to prompt a user to input the type of merchandise (the "merchandise type") within the package as part of step 208. The data 86 (only a few of which are specifically indicated for simplicity) input to the interface of FIG. 9 is read, stored and used by the processor 60 to generate the damage assessment data 96.

Exemplary interface 900 presents a plurality of different merchandise types, which comprise the list of merchandise in step 208. Each type of merchandise in the list in exemplary interface 900 may be associated with a fragility class. The associations of the different types of merchandise with different fragility classes may be structured a variety of ways, and may include a wide variety of different merchandise. For example, a shipping carrier may decide to associate all clothing in the "rugged" fragility class, all glass merchandise in the "fragile" subclass, all artwork within the "semi-delicate" subclass. Thus, each merchandise type listed is associated with a fragility class which is invisible to the user interacting with exemplary interface 900.

Each merchandise type in the merchandise list in exemplary interface 900 has a corresponding radio button. The user is prompted to actuate the radio button corresponding to the type of merchandise in the package. These types of merchandise comprising the list, and the manner in which the user may indicate the merchandise type, may vary within the spirit and scope of the present invention. Those of ordinary skilled will appreciate that exemplary interface 900 is shown for exemplary purposes only, and various types of interfaces may prompt a user for selection of the merchandise type.

FIG. 10 is an exemplary interface for presenting the fragility inquiries to the user. This exemplary interface 1000 would be presented to the user at step 212 of the "define merchandise" process 200 at step 212 to obtain the fragility data that is used to assign the merchandise to a fragility class at step 104. Exemplary interface 1000 can be presented in a variety of forms, and may include a variety of fragility inquiries. Fragility inquiries in exemplary interface 1000 ask inquiries relating to shock, edge shock, compression, and vibration, but other inquiries may be asked of the user regarding the package.

The user may be offered a drop down menu to provide responses to the fragility inquiries in exemplary interface 1000. These responses, comprising the "fragility data" of the present invention, are transmitted to the parcel investigation device at step 216 of the "define merchandise" process 200. The data 86 input to the interface of FIG. 10 is read, stored and used by the processor 60 to generate the damage assessment data 96.

FIG. 11 is an exemplary interface for prompting a user to input location and tracking information. This exemplary interface would be used to obtain the location or tracking information in step 202 of the "define merchandise" process 200. Exemplary interface 1100 comprises input fields for asking a user one or more inquiries about location and tracking information about the package. In exemplary interface 1100, the inquiries inquire as to the tracking number, package weight, package length, package width, package height, location, and fallout information, which is discussed in greater detail in the discussion for FIG. 13. These inquiries may total more or less inquiries than shown in exemplary interface 1100, and may ask different inquiries regarding the package within the spirit and scope of the present invention. The data 86 input to the interface of FIG. 11 is read, stored and used by the processor 60 to generate the damage assessment data 96.

FIG. 12 is an exemplary interface for prompting a user for information relating to merchandise fallout when the user selects "yes" to the inquiry regarding merchandise fallout in exemplary interface 1100. Fallout occurs when merchandise or pieces of merchandise become separated from the package.

The discovery of merchandise fallout may occur a number of different ways during the shipping process. One possibility includes human sight, or a computation performed wherein the weight of the package in an initial phase of the shipping process is compared to the weight of the package during the damage investigation process or while in transit. For example, a package may be weighed by the shipper, customer, a shipping retail outlet, or any other party to the shipping process upon receipt of the package for shipping, and then the shipping carrier may weigh the package at various times during the shipping process, including during the damage investigation process or while in transit.

If there is a difference in the weight of the package between the time of receipt of the package (which may be ascertained by referencing package level detail information or "PLD" information) and the arrival of the package at the final destination, a user would select "Yes" to the inquiry on the exemplary interface 1100 inquiring as to merchandise fallout. The user would then be presented with exemplary interface 1200 to input information relating to the fallout, such as whether merchandise is missing, whether the box is empty, and whether there is an invoice present. The data 86 input to the interface of FIG. 12 is read, stored and used by the processor 60 to generate the damage assessment data 96.

FIG. 13 is an exemplary interface for prompting a user for damage information. This damage information may be included in said packaging information associated with the damaged package. Exemplary interface 1300 prompts a user to input a description of the damaged merchandise, the total number of pieces of merchandise damaged (which may include the total number of packages damaged or the total number of pieces of merchandise damaged), the total number of identical merchandise (which may include merchandise or packages), and whether the external packaging of the package is new or used. Other information besides the information shown in exemplary interface 1300 may be requested also from the user.

This damage information may be used by the package investigation system a variety of ways. Determining whether an applicable business rule exists may involve referencing the damage information. Also, damage information may be incorporated in a customer notification, if available, to notify the customer why a particular damage claim was denied, or may be stored in a storage device for research purposes for the shipping carrier. The data 86 input to the interface of FIG. 12 is read, stored and used by the processor 60 to generate the damage assessment data 96.

FIG. 14 is an exemplary interface for prompting a user for information relating to the external packaging type. As seen in exemplary interface 1400, various types of external packaging are presented to the user, including box, envelope, padded envelope, UPS® envelope, and UPS® box. The user selects a radio button corresponding to the type of external packaging, and this selection is used in the package investigation process at step 106 of the parcel investigation method 100, which involves determining the minimum packaging requirements for the package, wherein the type of external packaging is used to reference the minimum packaging requirements. The type of external packaging selected by the user would be used to reference the minimum packaging matrix for external packaging (which may comprise either FIG. 3 or 4, depending on whether the external packaging comprises a new or re-used corrugated shipping container) to determine whether the particular type of external packaging meets the minimum packaging requirements for the fragility class for the package. The data 86 input to the interface of FIG. 14 is read, stored and used by the processor 60 to generate the damage assessment data 96.

FIG. 15 is an exemplary interface for prompting a user for information relating to the corrugated shipping container. This exemplary interface 1500 may be involved in determining the minimum packaging requirements at step 106, for the characteristics of the corrugated shipping container are used to reference the minimum packaging requirements 1500 to determine if the corrugated shipping container meets the minimum packaging requirements.

Exemplary interface 1500 presents a number of different characteristics of corrugated shipping containers, including burst information, edge crush test (ECT) information, whether the corrugated shipping container has a single wall or triple wall, and whether the corrugated shipping container is missing a certificate. A certificate may be placed on a corrugated shipping container that indicates the type of corrugated shipping container or various physical characteristics, such as ECT and burst information. This information is input into the exemplary packaging information as part of the damage investigation process. While the certificate on the package, if present, may present information to rate the fragility of the package, this information may need to be reduced if the package is used. The data 86 input to the interface of FIG. 15 is read, stored and used by the processor 60 to generate the damage assessment data 96.

FIG. 16 is an exemplary interface for prompting a user for internal packaging information. This exemplary interface 1600 may be used at step 106 of parcel investigation method 100, which comprises determining the minimum packaging requirements, for the internal packaging information is used to reference the minimum packaging requirements matrix shown in FIG. 5.

Exemplary interface 1600 presents several types of internal packaging, such as small cell bubble sheeting, large cell bubble sheeting, foam sheeting, loose fill/peanuts, paper, shredded material, air bags, poly bag, foam cushions, paper carton, or formed package. The user selects the appropriate type of internal packaging by actuating a radio button next to the appropriate entry. The type of internal packaging selected by the user is then used to reference the minimum packaging requirements matrix shown in FIG. 5 to determine if the internal packaging meets the minimum packaging requirements for the appropriate fragility class. The data 86 input to the interface of FIG. 16 is read, stored and used by the processor 60 to generate the damage assessment data 96.

FIG. 17 is an exemplary interface for prompting a user for package closure information. Exemplary interface 1700 presents several different types of closures, including tape, glue, staples, nails, screws, or straps. The user is prompted to enter the type of closure by clicking the radio button to the side of the appropriate closure listing. This selected type of closure is used in determining the minimum packaging requirements for the package at step 106 of parcel investigation method 100 by locating the selected type of closure in minimum packaging requirements matrix 600, then determining if the selected type of closure meets the minimum packaging requirements for the fragility class for the package. The data 86 input to the interface of FIG. 17 is read, stored and used by the processor 60 to generate the damage assessment data 96.

FIG. 18 is an exemplary interface for prompting a user for product placement description. Product placement refers to the location and positioning of the merchandise within the package. Exemplary interface 1800 presents several different product placement possibilities, including "product against product", "product against carton", and "fragile against hard object". The user selects the radio button adjacent to the description of the product placement in the package being analyzed, and this product placement information is used in the parcel investigation method 100 at step 106 in determining the minimum packaging requirements for the package. The product placement information is used to reference minimum packaging requirements matrix 600 to determine if the package meets the minimum packaging requirements for the fragility class assigned to the package. The data 86 input to the interface of FIG. 18 is read, stored and used by the processor 60 to generate the damage assessment data 96.

FIG. 19 is an exemplary interface for prompting a user for external package appearance information. This external package appearance information may be included within the damage information, which may be used to locate potential applicable business rules that apply to the package.

A damage inspector presented with exemplary interface 1900, who is analyzing a package for damage, will select the appropriate radio button corresponding to the type of damage sustained by the package. The types of damage presented on exemplary interface 1900 may include, but is not limited to, "belt burn", whether the package is crushed, torn, dented, bent, wet, or has open flaps. A package sustains "belt burn" when the package is damaged while being transported on a belt, such as a conveyor belt, as part of the shipping process. The user also may select an option indicating that the package does not have any obvious damage, for example, if the package is suspected to have been damaged from an incident witnessed by the damage inspector or other agent of the shipping carrier, such as falling off a forklift or truck. Those of ordinary skill will appreciate that different types of damage may be included in the exemplary interface 1900 than the types of damaged listed. The data 86 input to the interface of FIG. 19 is read, stored and used by the processor 60 to generate the damage assessment data 96.

FIG. 20 is an exemplary damage discovery document for use in inspecting a damaged package. Document 2000 would be used by a damage inspector when initially analyzing a damaged package. Information that may be included on the exemplary damage discovery document may include the type of discovery, the location of the package, whether the package has been crushed or has suffered from fallout, the number of packages or pieces of merchandise damaged, and an indication of the identification of the damage inspector. The document 2000 may comprise a variety of forms, including paper or electronic. Document 2000 may also be used to provide information at various steps in the parcel investigation method 100 or the "define merchandise" process 200, including the receipt of location or tracking number at step 202 of the "define merchandise" process 200. The data 86 input to the interface of FIG. 20 is read, stored and used by the processor 60 to generate the damage assessment data 96.

Having now described a few embodiments of the invention, and some modifications and variations thereto, it should be apparent to those of ordinary skilled that the foregoing is merely illustrative and not limiting, having been presented by the way of example only. Numerous modifications and other embodiments are within the scope of one of ordinary skill and are contemplated as falling within the scope of the invention as limited only by the appended claims and equivalents thereto.

What is claimed is:

1. A method of analyzing damage to a package sent by a sender via a shipping carrier to a recipient to process a damage claim in a damage investigation system, said package comprising merchandise and packaging, the packaging comprising an external casing and material between at least a portion of the merchandise and the external casing, and said method comprising the steps of:
   receiving location information, dimensions of the package, and a tracking number for the package based on user input received via the damage investigation system;
   determining, with the damage investigation system, whether an invoice is available for the package based on the location information, damage discovery information, and the tracking number for the package;
   in response to the invoice being available for the package:
      obtaining details about the merchandise from the invoice;
      redacting a list of merchandise based on the details about the merchandise obtained from the invoice, the redacted list comprising a plurality of merchandise types;
      presenting on a display screen of the damage investigation system the redacted list of merchandise to a user; and
      in response to a merchandise type for the merchandise within the package being present in the redacted list:
         receiving input from the user via the damage investigation system indicating a selection of the merchandise type for the merchandise within the package from the redacted list; and
      in response to the merchandise type not being present in the redacted list:
         presenting the user with one or more fragility inquiries on the display screen requiring input from the user to identify fragility of the merchandise; and defining, with the damage investigation system, the merchandise type for the merchandise within the package from the user's input to the one or more fragility inquires;

assigning the merchandise to a fragility class based on: (1) the selection of the merchandise type from the redacted list or (2) the merchandise type defined from the user's input to the one or more fragility inquires;

determining the minimum packaging requirements for the package based on the fragility class of the merchandise by the damage investigation system referencing one or more minimum packaging requirements matrices stored in memory, the minimum packaging requirements comprising predicted minimum external and internal packaging of the package to a meet a particular standard;

comparing, with the damage investigation system, information on the packaging to the minimum packaging requirements;

approving the damage claim in response to the damage investigation system indicating the packaging meets the minimum packaging requirements; and denying the damage claim in response to the damage investigation system indicating the packaging does not meet the minimum packaging requirements.

2. The method of claim 1, wherein said assigning step comprises assigning the merchandise to the fragility class based on a predetermined assignment of the merchandise to the fragility class.

3. The method of claim 1, further comprising the step of determining, with the damage investigation system, whether an applicable business rule applies to the package.

4. The method of claim 3, wherein said approving step further comprises approving said damage claim based on the applicable business rule.

5. The method of claim 3 wherein said denying step further comprises denying said damage claim based on the applicable business rule.

6. The method of claim 1, wherein said step of assigning the merchandise to the fragility class comprises:
   determining the merchandise has previously been assigned to a fragility class pursuant to a previous assignment; and
   deriving the assigned fragility class for the merchandise by referencing said previously assignment.

7. A computer-readable storage medium having executable code for causing a computer device to execute computer-readable instructions adapted for:
   receiving location information, dimensions of the package, and a tracking number for a package comprising merchandise and packaging based on user input, the package being sent by a sender via a shipping carrier to a recipient;
   determining whether an invoice is available for the package based on the location information, damage discovery information, and the tracking number for the package;
   in response to the invoice being available for the package:
      obtaining details about the merchandise from the invoice;
      redacting a list of merchandise based on the details about the merchandise obtained from the invoice, the redacted list comprising a plurality of merchandise types;
      presenting the redacted list of merchandise to a user; and
      in response to a merchandise type for the merchandise within the package being present in the redacted list:
         receiving input from the user indicating a selection of the merchandise type for the merchandise within the package from the redacted list; and
      in response to the merchandise type not being present in the redacted list:
         presenting the user with one or more fragility inquiries requiring input from the user to identify fragility of the merchandise; and
         defining the merchandise type for the merchandise within the package from the user's input to the one or more fragility inquires;
   assigning the merchandise to a fragility class based on: (1) the selection of the merchandise type from the redacted list or (2) the merchandise type defined from the user's input to the one or more fragility inquires;
   determining the minimum packaging requirements for the package based on the fragility class by referencing one or more minimum packaging requirements matrices, the minimum packaging requirements comprising predicted minimum external and internal packaging of the package to a meet a particular standard;
   comparing information on the packaging of the package to the minimum packaging requirements for the package;
   approving a damage claim in response to the packaging meeting the minimum packaging requirements; and
   denying the damage claim in response to the packaging not meeting the minimum packaging requirements.

8. The computer readable medium of claim 7, further comprising instructions for transmitting the defined merchandise to a component of a damage investigation system.

9. The computer readable medium of claim 7, further comprising instructions for transmitting the defined merchandise to an external device.

10. The computer readable medium of claim 7, further comprising instructions for assigning the fragility class based on a predetermined assignment of the merchandise to the fragility class.

11. The computer readable medium of claim 7, further comprising instructions for determining whether an applicable business rule applies to the package.

12. The computer readable medium of claim 11, further comprising instructions for approving or denying said damage claim based on said applicable business rule.

13. The computer readable medium of claim 7, further comprising instructions for assigning the merchandise to the fragility class by:
   determining the merchandise has previously been assigned to the fragility class pursuant to a previous assignment; and
   deriving the assigned fragility class for the merchandise by referencing said previous assignment.

14. A system for analyzing damage to a package sent by a sender via a shipping carrier to a recipient to process a damage claim for the package, said system comprising:
   a processor;
   a display device communicatively coupled to said processor;
   a storage device communicatively coupled to said processor;
   an output device communicatively coupled to said processor, said output device configured to output an indication regarding an approval or a denial of the damage claim to a user;
   a minimum packaging requirements matrix module for storing one or more minimum packaging requirements matrices in said storage device;

a damage assessor module, said damage assessor module configured to instruct the processor to:
  receive location information, dimensions of the package, and a tracking number for the package based on user input;
  determine whether an invoice is available for the package based on the location information, damage discovery information, and the tracking number for the package;
  in response to the invoice being available for the package:
    obtain details about the merchandise from the invoice;
    redact a list of merchandise based on the details about the merchandise obtained from the invoice, the redacted list comprising a plurality of merchandise types;
    present on the display device the redacted list of merchandise to a user; and
    in response to a merchandise type for the merchandise within the package being present in the redacted list:
      receive input from the user indicating a selection of the merchandise type for the merchandise within the package from the redacted list; and
    in response to the merchandise not being present in the redacted list:
      present the user with one or more fragility inquiries on the display device requiring input from the user to identify fragility of the merchandise; and
      define the merchandise type for the merchandise within the package from the user's input to the one or more fragility inquires;
  assign the merchandise to a fragility class based on: (1) the selection of the merchandise type from the redacted list or (2) the merchandise type defined from the user's input to the one or more fragility inquires; and
  determine minimum packaging requirements for packaging of the package by referencing the one or more minimum packaging requirements matrices based on the fragility class of the package, the minimum packaging requirements comprising predicted minimum external and internal packaging of the package to a meet a particular standard; and
  compare the packaging of the package to the minimum packaging requirements; and
a claim processor module, said claim processor module configured to instruct the processor to:
  approve or deny the damage claim for the package based on the comparison between the packaging of the package and the minimum packaging requirements; and
  communicate the approval or the denial of the damage claim to the user via said output device.

15. The system of claim 14, further comprising a network interface for communicating with a computer network.

16. The system of claim 14, wherein said output device comprises the display device.

17. The system of claim 14, wherein said output device comprises a printer.

18. The system of claim 14, wherein said indication comprises a document regarding the approval or the denial of the damage claim.

19. The system of claim 14, wherein said minimum packaging requirements module, said damage assessor module, and said claim processor module is stored in said storage device.

20. The system of claim 14, wherein said damage assessor module is further configured to determine whether a business rule is applicable to the package.

21. The system of claim 20, wherein said claim processor module is further configured to supersede said comparing step by said damage assessor module whether the business rule is applicable.

22. The method of claim 1, wherein the fragility inquiries comprise one or more questions directed to determining whether the merchandise is susceptible to damage from shock, edge shock, compression, and vibration.

23. The computer readable medium of claim 7, wherein the fragility inquiries comprise one or more questions directed to determining whether the merchandise is susceptible to damage from shock, edge shock, compression, and vibration.

24. The system of claim 14, wherein the fragility inquiries comprise one or more questions directed to determining whether the merchandise is susceptible to damage from shock, edge shock, compression, and vibration.

* * * * *